Figure 1:
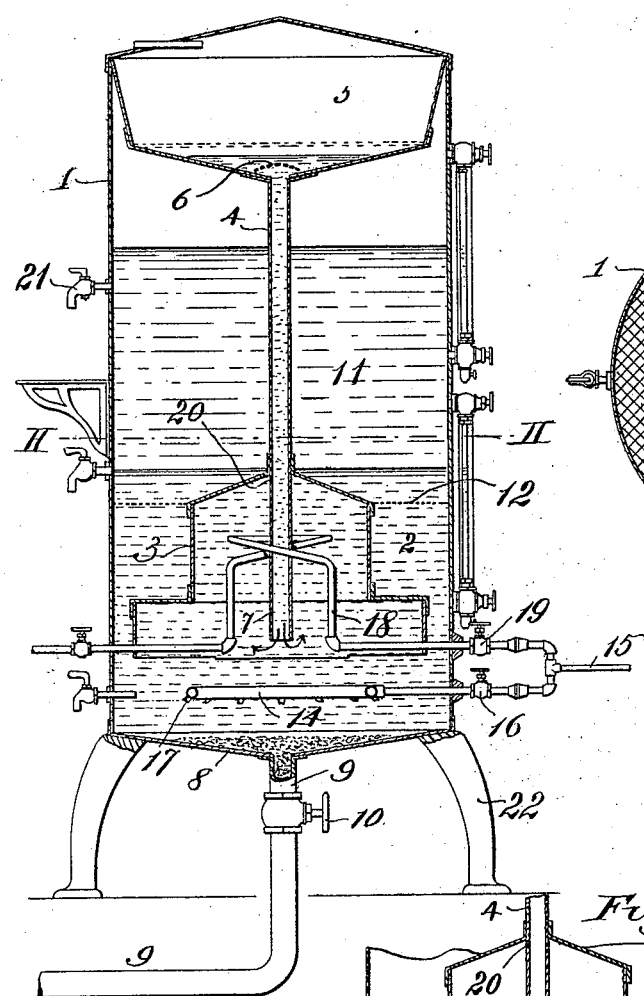

(No Model.)

D. H. McCLELLAND.
OIL PURIFIER.

No. 530,897. Patented Dec. 11, 1894.

WITNESSES:
H. Graham
Jos. H. Milans

INVENTOR
D. H. McClelland
BY Graham & Loew
ATTORNEYS.

UNITED STATES PATENT OFFICE.

DAVID H. McCLELLAND, OF WASHINGTON, DISTRICT OF COLUMBIA.

OIL-PURIFIER.

SPECIFICATION forming part of Letters Patent No. 530,897, dated December 11, 1894.

Application filed June 26, 1894. Serial No. 515,709. (No model.)

*To all whom it may concern:*

Be it known that I, DAVID H. MCCLELLAND, a citizen of the United States of America, residing in the city of Washington, District of Columbia, have invented certain new and useful Improvements in Oil-Purifiers, of which the following is a specification.

My invention relates to that class of oil-purifiers in which the oil mixed with its sediment, grit, dirt or other impurity is passed through water, heated or otherwise, or through any suitable solution, and caused to deposit in the liquid through which it is passed its impurity. By this process, and an apparatus suitable for carrying it into effect, all impurities which are heavier than the water or solution are readily separated, provided the oil is not too quickly passed through it, and provided the liquid contents of the apparatus are not so agitated as to cause the impurities thrown down to be stirred up and again mixed with the oil.

It is the object of my improvements, in such an apparatus, first to retard the impure oil in its passage through the purifying liquid; second, to obstruct the passage of any impurities which may be lighter than the purifying water or solution; and finally to promote the efficiency of the process and improve the quality of the purified oil.

With such objects in view my invention consists in an oil purifier of the class described provided with an inverted bell or equivalent means for holding the impure oil beneath the surface of and in contact with the body of the purifying liquid, and an obstructing screen arranged at or above the point or points where the oil finds its exit from the bell and adapted both to retard the passage of the oil and aid the latter in freeing itself from the heavier sediment, and to obstruct the passage with the oil of any impurity which is lighter than the water or solution. By my improvements also I am enabled to combine with the purifier a washing or clearing-out device, such as a water or steam jet nozzle or nozzles, and to operate the same without entirely emptying the apparatus and notwithstanding the presence of a body of purified oil above the purifying liquid or solution, the said screen serving to prevent the incoming jets of water or steam and the consequent agitation of the liquid in the base of the apparatus from causing the oil and sediment to become again mingled.

Such being the general nature of my invention, in order to make the same more clearly understood I have shown in the accompanying drawings means for carrying the same into practical effect, without limiting my improvements in their useful applications to the particular construction which, for the sake of illustration I have delineated.

Figure 2:
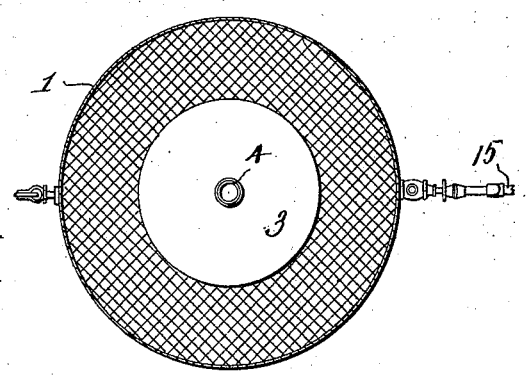
Figure 4:
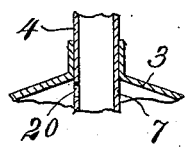
Figure 3:
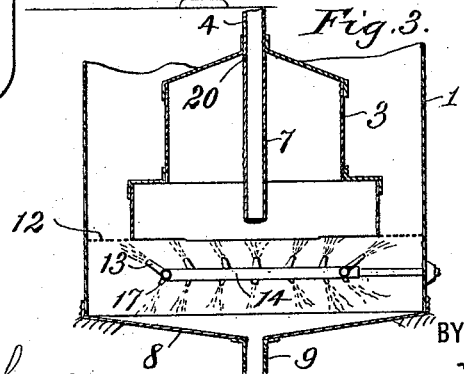

In said drawings:—Figure 1 is a vertical sectional view of an oil purifier embodying my invention. Fig. 2 is a horizontal section on line II—II, of Fig. 1. Fig. 3 is a vertical sectional view showing a different arrangement of the impurity obstructing means. Fig. 4 is a vertical sectional view of the upper portion of the bell and contiguous parts of the oil delivery pipe and extension.

Referring to the drawings: 1 indicates the body or main reservoir of the purifier, in the lower portion of which a purifying liquid medium, such as water, or any suitable purifying agent dissolved in water, is placed as indicated at 2.

3 is a bell submerged in said liquid and communicating at its upper end by a pipe 4 with a reservoir 5 for the impure oil. This reservoir fits neatly in and is supported by the upper end of the chamber, and may be removed therefrom carrying with it the pipe 4 and bell 3, which latter is supported by the pipe.

The dirty or impure oil to be treated is placed in the reservoir 5, and gradually finds its way into and down the pipe 4. The impure oil is often in the form of a thick mud being charged with a great amount of sediment, and in order to arrest some of the solid constituents of the mixture in the reservoir 5, the latter may be provided with a perforated or reticulated strainer 6 placed above the mouth of the pipe 4.

It is desirable to deliver the oil passing down the latter pipe at as great a depth as possible below the surface of the purifying liquid, and said pipe is accordingly furnished with an extension 7 within the bell 3 and extending to or near the lower edge thereof. From the lower end of this extension the impure oil issues as indicated by the arrows and, when the apparatus is first put into operation, rises into the bell 3 through the purifying liquid therein, gradually displacing said liquid and filling the bell. The impure oil thus held in the bell throws down all foreign matter or sediment which is heavier than the purifying liquid, this operation taking place by gravity and the sediment collecting in the conical bottom 8 of the purifier. From the apex of the said bottom a waste pipe 9 controlled by a valve 10 leads away as indicated in Fig. 1, to a sewer or other suitable place of delivery for refuse. As the oil continues to be delivered into the bell 3 it displaces oil which has been standing therein and which has become free from all or a portion of its impurities, and such displaced oil passes under the bottom edge of the bell and rises through the purifying liquid 2 to the surface of the latter where it collects in a body of purified and clear oil indicated at 11. As the oil thus rises through and to the surface of the purifying liquid it throws down any remaining sediment or impurity which may remain in it when it leaves the bell, provided such impurity is heavier than the purifying liquid.

12 is a very finely perforated or reticulated screen or sieve situated transversely in the reservoir 1 and preferably below the surface of the purifying liquid. This screen serves to obstruct the upward passage into the body 11 of purified oil of any particles which will not separate from the oil by gravity and which may have been carried thus far with the oil.

The screen 12 may be arranged at or near the upper end of the bell 3, as indicated in Figs. 1 and 2, or it may be situated at the lower end of the bell as shown in Fig. 3.

In the latter construction I provide for more perfectly cleansing the under side of the screen when the purifier is cleaned out and the accumulated sediment together with all or a portion of the purifying liquid is permitted to escape through the pipe 9, by means of jet nozzles 13 (Fig. 3) connected with a circular pipe 14 to which steam or hot water may be conducted from a pipe 15 controlled by a valve 16. The streams of water or steam from the nozzles 13 impinging upon the under side of the screen 12 completely wash off its under surface and clear its meshes or perforations.

For washing out the accumulated sediment in the base of the reservoir the pipe 14 is provided with downwardly directed nozzles 17, the jets from which serve to stir up the sediment and to cause it to be washed down the waste pipe 9 with the escaping liquid.

18 is a heating coil within the bell adapted to raise the temperature of the oil therein and to promote the dejection of its sediment, which coil may be fed from the pipe 15 under control of a valve 19.

In order to provide for the ready escape of air or confined gas from the bell 3, without the use of any expensive, inconvenient and obstructing pipes I provide the extension 7, at a point immediately below the top of the bell 3, with an orifice 20 (Fig. 4) through which any such air or gas may readily pass into the pipe 4 and thence escape through the top of the apparatus. The whole interior of the bell 3 is by this means enabled to be filled by the oil to be purified and the latter cannot be displaced by any accumulation of air, gas or steam.

21 is a cock through which the purified oil may be drawn off.

22 indicates legs or suitable supports for the reservoir to permit of the use of the pipe 9 and the convenient manipulation of the valve 10. Where it is inconvenient to use the pipe 9 as a connection with a sewer or equivalent place of deposit exterior to the building in which the apparatus is used, such pipe may terminate above the floor and a suitable receptacle may be placed under it to receive the sediment when the purifier is to be cleaned out.

The apparatus is preferably supplied with the usual gages as indicated for showing the heights of the oil and of the purifying liquid.

I claim—

1. In an oil purifier the combination of a reservoir for a purifying liquid, a bell or oil receptacle therein having an opening or openings through which the oil may pass into said liquid at a point below the surface of the latter, a pipe for supplying oil to said receptacle, a screen situated in said reservoir in the path of the oil, and means above the screen for drawing off the purified oil, substantially as set forth.

2. In an oil purifier the combination in a reservoir, of a bell open at its under side and situated in the lower portion of said reservoir, and a transverse obstructing screen situated above the point or points of exit from the bell, means for supplying the oil to be purified to said bell, and means above the screen for drawing off the oil, substantially as set forth.

3. In an oil purifier the combination in a suitable reservoir, of a bell adapted to be submerged beneath the purifying liquid, a transverse obstructing screen situated at or above the point or points of exit from said bell, means for washing off the under side of said screen, and a pipe for supplying oil to the bell, substantially as set forth.

4. In an oil purifier the combination of a reservoir adapted to contain a purifying liquid, a bell open at its under side situated in said reservoir and having suitable oil-supply devices, a transverse obstructing screen connecting said bell with the walls of the reservoir and means above the screen for drawing off the oil, substantially as set forth.

5. The combination with the reservoir, of the bell open at its under side, the screen 12 above the lower edge of said bell, the jet nozzles below the screen, and means for supplying the latter with a vapor or liquid, substantially as set forth.

6. The combination with the reservoir, of the bell open at its under side, the supply pipe thereon, and the extension of the latter having the perforation 20 within the bell, for the purposes set forth.

In witness whereof I have hereunto signed my name in the presence of two witnesses.

DAVID H. McCLELLAND.

Witnesses:
 H. N. LOW,
 J. H. MILANS.